United States Patent [19]
Esaki et al.

[11] Patent Number: 5,765,474
[45] Date of Patent: Jun. 16, 1998

[54] HOT STAMPING METHOD AND APPARATUS FOR PHOTO FILM SPOOL

[75] Inventors: Toshiro Esaki; Masayoshi Wada; Hideki Matsuzawa, all of Kanagawa, Japan

[73] Assignee: Fuji Photo Film Co., Ltd., Kanagawa, Japan

[21] Appl. No.: 754,254

[22] Filed: Nov. 20, 1996

[30] Foreign Application Priority Data

Nov. 22, 1995 [JP] Japan ................... 7-304785

[51] Int. Cl.⁶ .................................................. B41F 17/20
[52] U.S. Cl. ................. 101/41; 101/4; 101/DIG. 31; 101/407.1; 101/485; 400/105
[58] Field of Search ................. 400/105, 104, 400/106; 101/4, 35, 41, 43, 44, 407.1, 27, DIG. 31, 485

[56] References Cited

U.S. PATENT DOCUMENTS

| | | | |
|---|---|---|---|
| 3,878,775 | 4/1975 | Fish | 101/41 |
| 4,423,680 | 1/1984 | Bishop | 101/41 |
| 4,592,668 | 6/1986 | Kubacki et al. | 101/4 |
| 4,832,275 | 5/1989 | Robertson | 242/71.1 |
| 4,834,306 | 5/1989 | Robertson et al. | 242/71.1 |
| 5,170,704 | 12/1992 | Warren et al. | 101/41 |
| 5,271,577 | 12/1993 | Takahashi et al. | 242/71.16 |
| 5,407,146 | 4/1995 | Takahashi et al. | 242/348 |
| 5,429,045 | 7/1995 | Karlyn et al. | 101/35 |
| 5,504,688 | 4/1996 | Letourneau | 101/4 |

*Primary Examiner*—Christopher A. Bennett
*Attorney, Agent, or Firm*—Sughrue, Mion, Zinn, Macpeak & Seas, PLLC

[57] ABSTRACT

A photo film cassette has a spool about which photo film is wound. A data disk is disposed near to an axial end of a core of the spool. To record a bar code on the data disk in manufacturing the photo film cassette, a hot stamping apparatus includes at least one spool holder for holding the spool in a slidable manner while the core is erect and the data disk is oriented upwards. A disk support supports the data disk. A slider shifts the disk support between a retracted position away from the spool holder and an advanced position close to the spool holder. The disk support in the advanced position is adapted to lift the data disk by contact with a bottom of the data disk. A hot stamping head is pressed against a top of the data disk, and records a bar code thereto. Cushion springs are biasing the disk support up toward the hot stamping head.

17 Claims, 16 Drawing Sheets

F I G. 12A
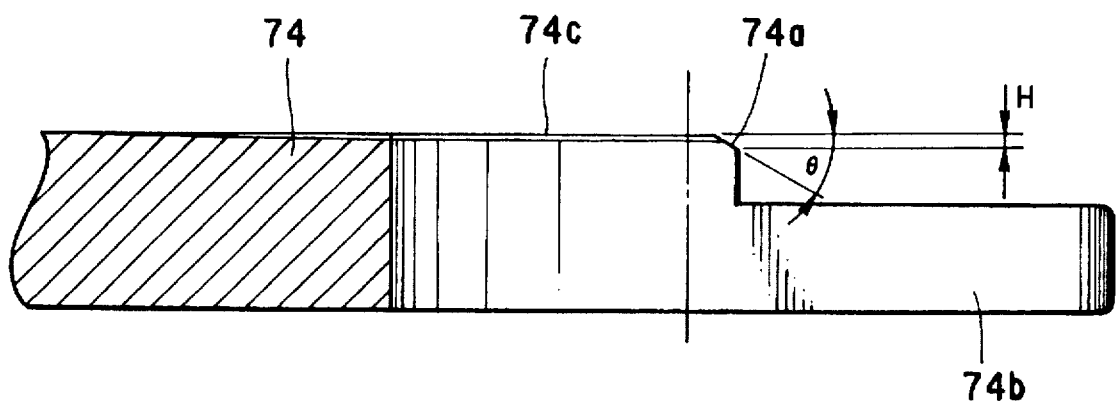

HOT STAMPING METHOD AND APPARATUS FOR PHOTO FILM SPOOL

BACKGROUND OF THE INVENTION

1. Field of the Invention

The present invention relates to a hot stamping method and apparatus for a photo film spool. More particularly, the present invention relates to a hot stamping method and apparatus for printing a bar code to a flat portion of a photo film spool.

2. Description Related to the Prior Art

U.S. Pat. Nos. 4,832,275, 4,834,306, 5,271,577 (corresponding to JP-A 3-37645) and 5,407,146 (corresponding to JP-A 3-37645) disclose a photo film cassette of an improved type with which a camera can be loaded easily, which can be handled efficiently in a photo laboratory, and which can be treated manually with ease by operators. The photo film cassette is characterized in that rotation of a core of a spool causes a leader of a photo filmstrip to advance to the outside of a cassette shell.

The spool of the cassette has a data disk, on which a bar code is printed to represent photo film data such as photo sensitivity and a maximum photographable number of frames. There is a suggestion in which the bar code is constituted by a high-level pattern and a low-level pattern, and the high-level pattern is formed by a hot stamping technique or foil stamping technique with thin foil having high reflectance, such as aluminum. The low-level pattern is defined by the dark color of the data disk about portions of the high-level pattern.

There is a shortcoming of low efficiency in the hot stamping of only a single spool at one time. To increase efficiency in the production of spools, it is desired to quicken the operation of the hot stamping and/or treat a plurality of spools in the hot stamping at one time.

It is likely that the quality of hot stamping is low if the hot stamping is quickened. When a plurality of spools are subjected to the hot stamping at one time, irregularity between the spools in the hot stamping causes defects such as partial breakage of the foil provided by the hot stamping and burr on the edge of the foil.

SUMMARY OF THE INVENTION

In view of the foregoing problems, an object of the present invention is to provide a hot stamping method and apparatus for printing a bar code to a flat portion of a photo film spool with great efficiency and high quality.

In order to achieve the above and other objects and advantages of this invention, at least one spool holder means holds the spool in a slidable manner while the core is erect and the data disk is oriented upwards. Disk support means supports the data disk. Shifter means shifts the disk support means between a retracted position away from the spool holder means and an advanced position close to the spool holder means, the disk support means having the advanced position to lift the data disk in contact with a bottom of the data disk. A hot stamping head is pressed against a top of the data disk, for recording a bar code thereto while the data disk is supported on the disk support means. Cushion means biases the disk support means up toward the hot stamping head.

It is possible in accordance with the present invention to record the bar code to the data disk of a photo film spool with great efficiency and high quality.

In a preferred embodiment, the disk support means includes a flat portion contacted on the bottom of the data disk, and an arc-like cutout which is formed in the flat portion and into which the core is receivable.

The disk support means further includes two claws protruded from an edge of the flat portion, the claws constituting a fork with the flat portion, the claws receiving the core therebetween and located away from the data disk.

The edge of the flat portion is inclined for smoothly avoiding collision between the flat portion and the data disk.

The at least one spool holder means comprises plural spool holder means, and each of the spool holder means is associated with the disk support means, the hot stamping head, and the cushion means.

The hot stamping apparatus further has a rotatable indexing table. Plural pallets are arranged on the indexing table at a predetermined angle, each pallet having two or more of the spool holders arranged side by side. Rotating means rotates the indexing table to move the pallets past a spool setting station, a bar code recording station and a spool removing station in an order listed, the spool setting station being adapted to setting plural spools respectively at the spool holder means, the bar code recording station being adapted to recording the bar code to the data disk with the hot stamping head, and the spool removing station being adapted to removing the spools from the spool holder means.

Furthermore, a bar code reader reads the bar code from the data disk while the spools removed from the spool holder means are conveyed. Determiner means determines correctness of the bar code in accordance with a result of reading of the bar code reader.

BRIEF DESCRIPTION OF THE DRAWINGS

The above objects and advantages of the present invention will become more apparent from the following detailed description when read in connection with the accompanying drawings, in which:

FIG. 12A is a cross section illustrating each of the disk supports;

DETAILED DESCRIPTION OF THE PREFERRED EMBODIMENT(S) OF THE PRESENT INVENTION

Figure 1:
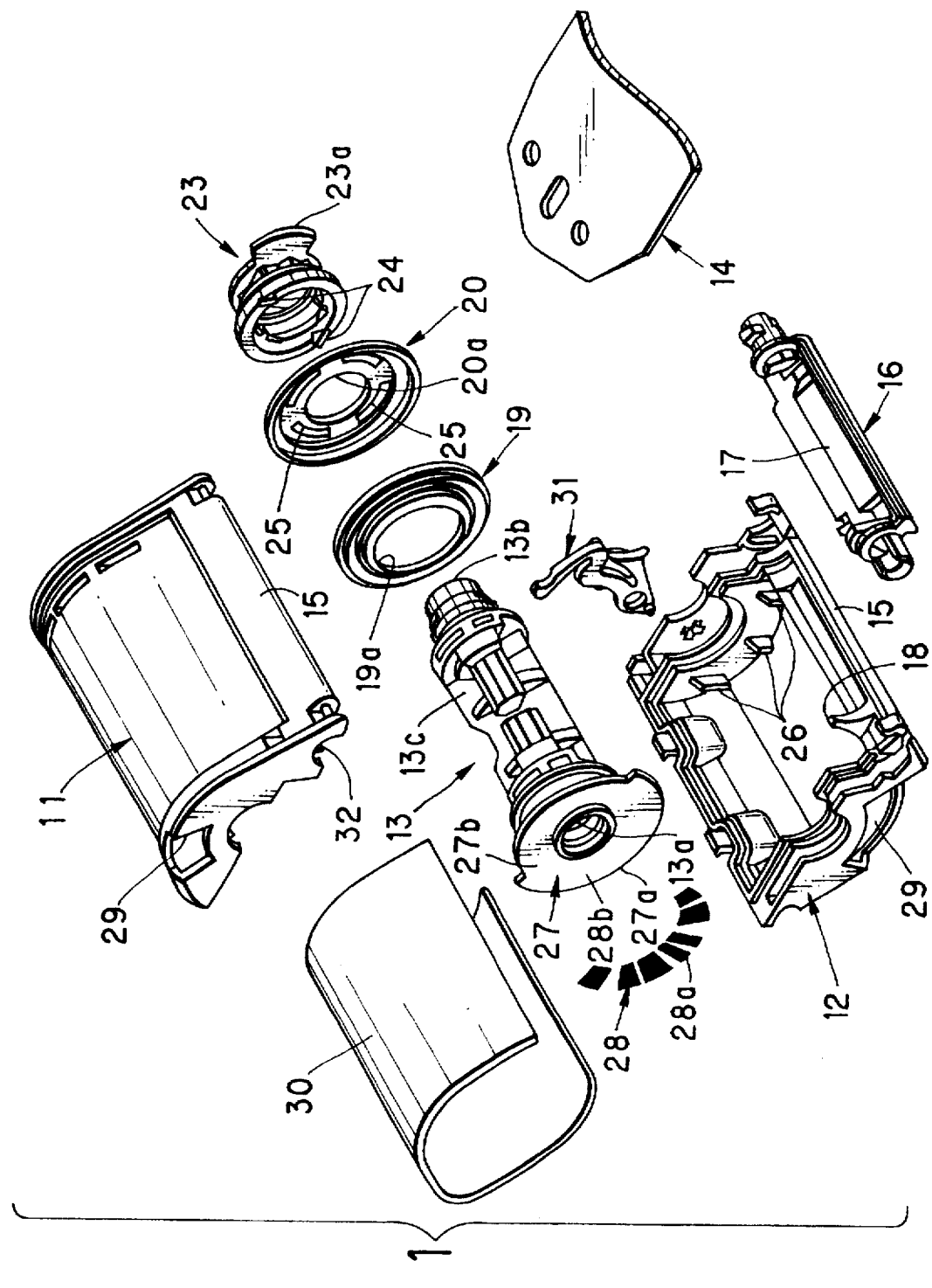
FIG. 1 is an exploded perspective illustrating a photo film cassette.
Figure 2:
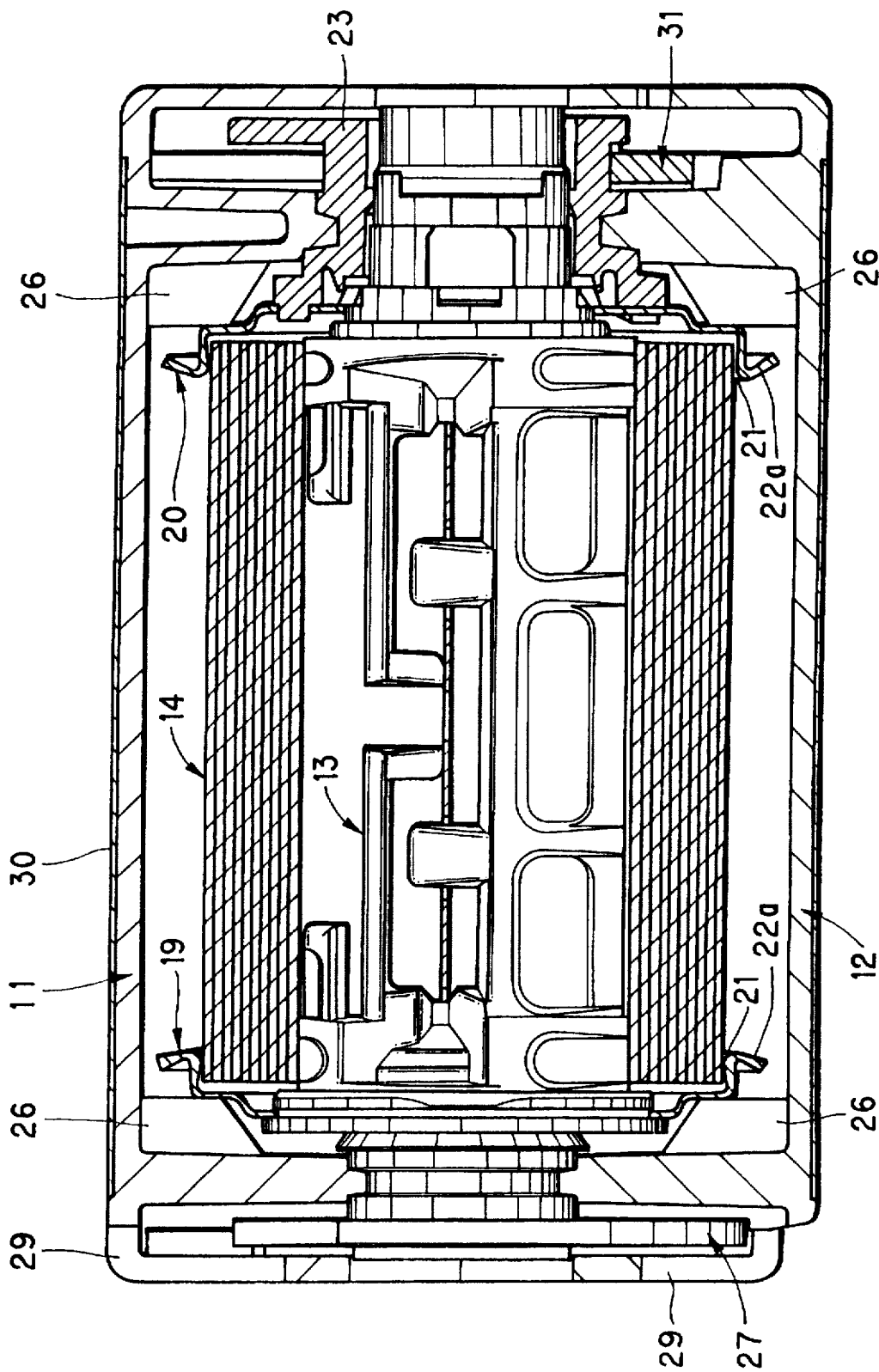
FIG. 2 is a transverse section illustrating the photo film cassette.

In FIGS. 1 and 2, a cassette shell 10 includes upper and lower shell halves 11 and 12 respectively formed from plastic. A spool core 13c of a spool 13 is contained in the cassette shell 10 in rotatable fashion, and has a photo filmstrip 14 wound in a roll form. Both axial ends of the spool core 13c appear externally through a wall of the cassette shell 10, and are provided with key bosses 13a and 13b for external axial engagement to rotate the spool core 13c.

The shell halves 11 and 12 respectively have a semi-cylindrical shape. There is a photo film port 15 defined between tongues extended from the shell halves 11 and 12. When the shell halves 11 and 12 are fitted together, a photo film port shutter 16 is rotatably contained in the photo film port 15. A photo film passageway 17 is formed as a gap in the photo film port shutter 16. When the photo film port shutter 16 rotates to an open position, the photo film passageway 17 communicates from the inside of the photo film port 15 to the outside, to allow the photo film 14 to pass. When the photo film port shutter 16 rotates to a closed position, the photo film port 15 is completely closed, to shield the inside of the cassette shell 10 from ambient light.

A separator claw 18 is formed in the position inward from the photo film port 15 of the lower shell half 12. The separator claw 18, when the spool core 13c is rotated, abuts on a leader of the photo film 14, separates the leader from the roll, and guides it to the photo film passageway 17.

Both of the shell halves 11 and 12 are molded from resin, which should have characteristics of small friction with the disks, high resistance to drop and shock, and resistance to thermal deformation. Examples of the resin are styrene resin, polycarbonate resin, acrylonitrile-butadiene-styrene (ABS) resin, polyester resin, nylon resin, modified polyphenylene ether resin, polyacetal resin, polypropylene resin, polyethylene resin, methyl methacrylate resin, teflon resin, polyphenylene sulfide resin, and mixture of any of those resins.

Disks 19 and 20 have respective axial holes 19a and 20a. The spool core 13c is inserted through the axial holes 19a and 20a to secure the disks 19 and 20 to the spool core 13c in rotatable fashion in their positions. There are formed ring-like lips 21 on the periphery of the disks 19 and 20 to project toward teach other. The ring-like lips 21 partially cover edges of the leader of the photo film 14.

When a barrel member 23 is fitted on the spool core 13c, retaining holes 25 in the disk 20 are retainable on the clutch claws 24. In rotation of the spool core 13c in the unwinding direction, the retaining holes 25 are retained by the clutch claws 24 to transmit rotation to the disk 20. When the spool core 13c is rotated in the winding direction, the retaining holes 25 are not retained by the clutch claws 24, so that the disk 20 is rotationally free from the spool core 13c. On the other hand, the disk 19 is always rotatable about the spool core 13c. There is a sector plate 23a formed with the barrel member 23. A position of the sector plate 23a is visible through one of indicator windows. An unexposed, exposed or developed status of the photo film cassette is indicated through one of the windows. To control the stop position of the sector plate 23a, rotational positions of the key bosses 13a and 13b are monitored and determined as required.

Ridges 26 are projected from an inside of the shell halves 11 and 12, and prevent the disks 19 and 20 from spreading. A data disk 27 is fixed on the spool core 13c, and has a greater radial sector 27a and a smaller radial sector 27b. The greater radial sector 27a has a radius substantially equal to that of the disks 19 and 20. The smaller radial sector 27b is defined by a cutout. A bar code 28 is recorded to a surface of the greater radial sector 27a, constituted by a high-level pattern 28a and a low-level pattern 28b, and represents information of the photo film 14 in their combination, such as photo film speed, a maximum photographable number of frames, a photo film type and being negative or positive.

The high-level pattern 28a is formed by a hot stamping technique or foil stamping technique with thin foil having high reflectance. The low-level pattern 28b is defined by the dark color of the greater radial sector 27a about portions of the high-level pattern 28a. The data disk 27 having the greater radial sector 27a is previously formed to have a color having low reflectance or a surface roughness having low reflectance. The bar code is photoelectrically detected through a window 29 in the cassette shell 10 when the spool core 13c is rotated. It is possible on the bar code to read information of a type of the photo film 14 contained in the cassette shell 10 and information of the number of frames of the photo film 14. A sticker 30 attached to the cassette shell 10 has indication of the photo film type information and an identifying information of the cassette.

A spool lock 31 blocks rotation of the spool core 13c while the photo film port shutter 16 has the closed position. When the photo film port shutter 16 is rotated to the open position, the spool core 13c is unblocked. Reference numeral 32 designates a lock pawl formed integrally with the upper shell half 11. The photo film port shutter 16 is locked by the lock pawl 32 when rotated to the closed position. A camera or a display device adapted with the photo film cassette includes an opener mechanism, which unlocks the lock pawl 32 to open the photo film port shutter 16 when the camera or display device is loaded with the photo film cassette. Note that it is possible to form a photo film passageway in the photo film port 15, and to attach plush or light-trap fabric instead of the use of the photo film port shutter 16, for the purpose of shielding ambient light from the cassette shell 10.

As illustrated in FIG. 2, when the photo film 14 is completely contained in the cassette shell 10, the leader of the photo film 14 is partially covered in the ring-like lips 21 of the disks 19 and 20, and prevented from being loosened about the spool core 13c. When the spool core 13c is rotated in the unwinding direction of the photo film 14, the photo film 14 rotates integrally with the spool core 13c.

The ridges 26 inside the shell halves 11 and 12 regulate movable ranges of the disks 19 and 20. In the position inward from the photo film port 15, an interval between confronted two of the ridges 26 is enlarged, locally to release the disks 19 and 20 in a spreadable manner. After the leader of the photo film 14 is separated by the separator claw 18 toward the photo film passageway 17, the disks 19 and 20 are spread outwards by lateral edges of the photo film 14. The photo film 14 is advanced from between the ring-like lips 21 in curled fashion like an archway.

Note that it is possible to eliminate a half of the ridges 26 on one end face of the cassette, while using the remaining half of the ridges 26. There are other alternative structures to releasing prevention of looseness of the photo film: a pair of separator claws are formed on both sides with reference to the width direction of the photo film. Lateral faces of the separator claws can keep the lips partially deformed in a direction away from one another.

When a camera is loaded with the photo film cassette, the camera releases the photo film port shutter 16 from the retention of the lock pawl 32, and rotates the photo film port shutter 16 to the open position. Then the spool core 13c is rotated in the unwinding direction, to start advancing the photo film 14. As the ring-like lips 21 of the disks 19 and 20 are avoiding loosening the photo film 14, the roll of the photo film 14 rotates integrally with the spool core 13c. The leader of the photo film 14 is separated by the separator claw 18, and directed to the photo film passageway 17.

While the leader of the photo film 14 is passed through the photo film passageway 17, the lateral edges of the photo film 14 spread the ring-like lips 21 outwards, so that the photo film 14 is released from being covered in the ring-like lips 21 in the position inward from the photo film passageway 17. The disk 20 is forcibly rotated in the unwinding direction in engagement of the clutch claws 24 with the retaining holes 25, and thus raises force to advance the photo film 14. This being so, rotation of the spool core 13 causes the photo film 14 to advance to the outside of the cassette shell 10.

In the photo film rewinding, the spool core 13c is rotated in reverse. As a trailer of the photo film 14 is retained on the spool core 13c, the photo film 14 is wound back into the cassette shell 10 by the rotation of the spool core 13c. In a position inward from the photo film passageway 17, the disks 19 and 20 are spread, between which the photo film 14 is taken up and wound about the spool core 13c.

Figure 3:
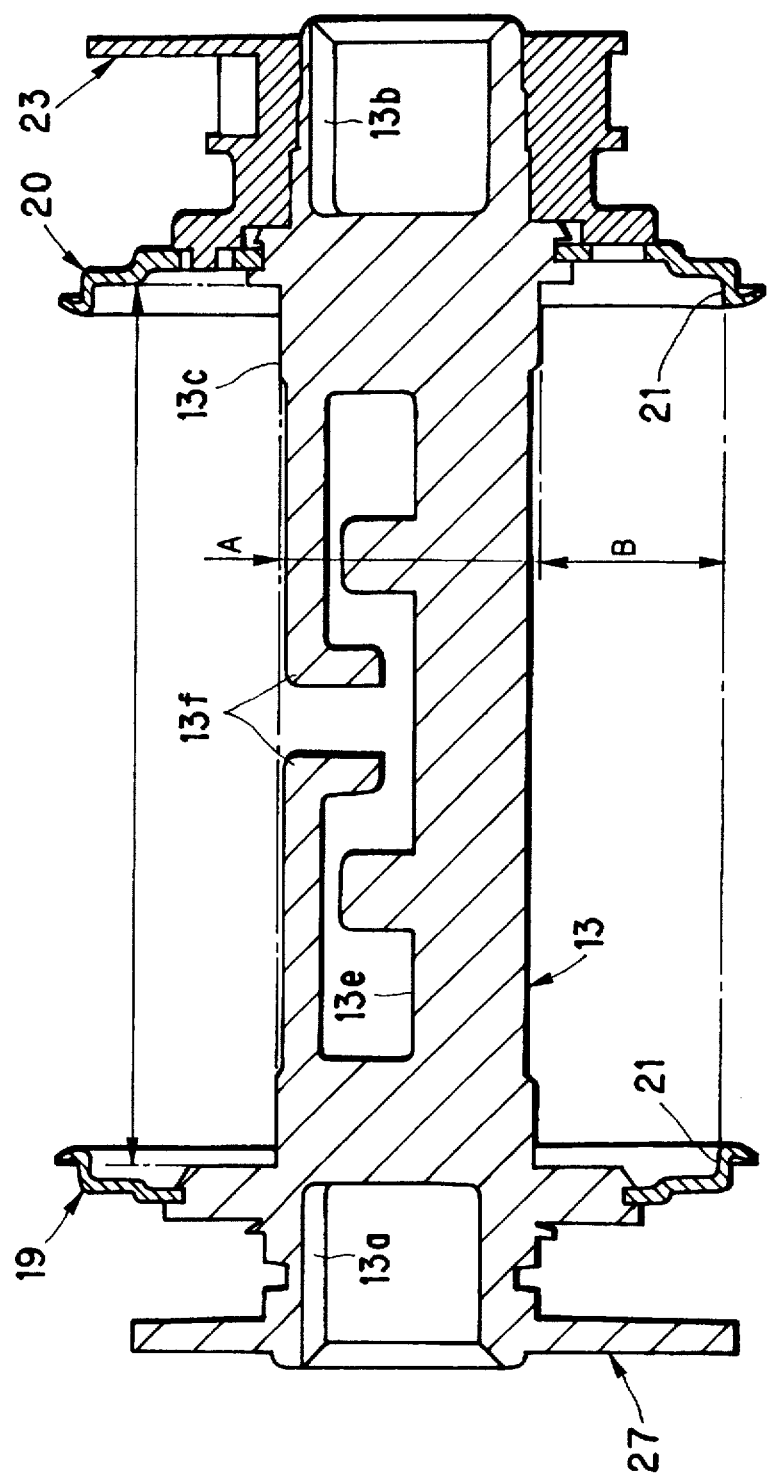
FIG. 3 is a transverse section illustrating a spool of the cassette.

In FIG. 3, the photo film 14 is wound between the disks 19 and 20 and in a range B between the ring-like lips 21 and the spool core 13c, and prevented from being loosened. The spool core 13c includes a slot 13e defined by ridges 13f, which operate for retaining the trailer of the photo film in the slot 13e. In FIG. 3, the spool core 13c is a type which has a diameter A, and is adapted to winding the photo film 14 having a great length determined for 40 exposures.

Figure 4:
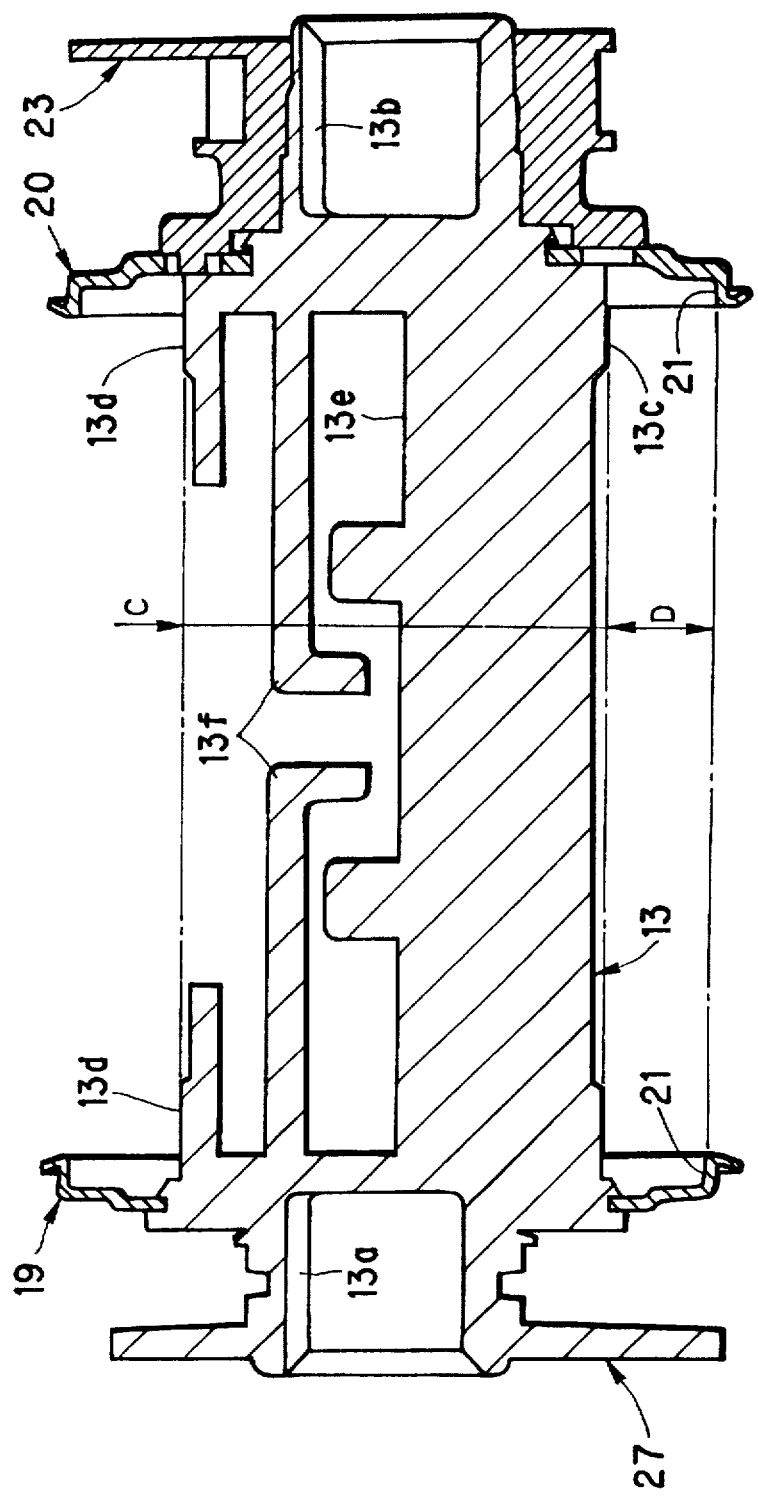
FIG. 4 is a transverse section illustrating a variant spool adapted to photo film having a shorter length.

A variant of the spool 13 in FIG. 4 further includes support portions 13d. In FIG. 4, the spool core 13c is a type of which a combination of the spool core 13c and the support portions 13d has a greater diameter C than the diameter A, and is adapted to winding the photo film 14 having a small length determined for 12 exposures. In FIG. 4, the photo film 14 is wound between the disks 19 and 20 and in a range D between the spool core 13c and the ring-like lips 21. The photo film 14 is of course prevented from being loosened.

Figure 5:
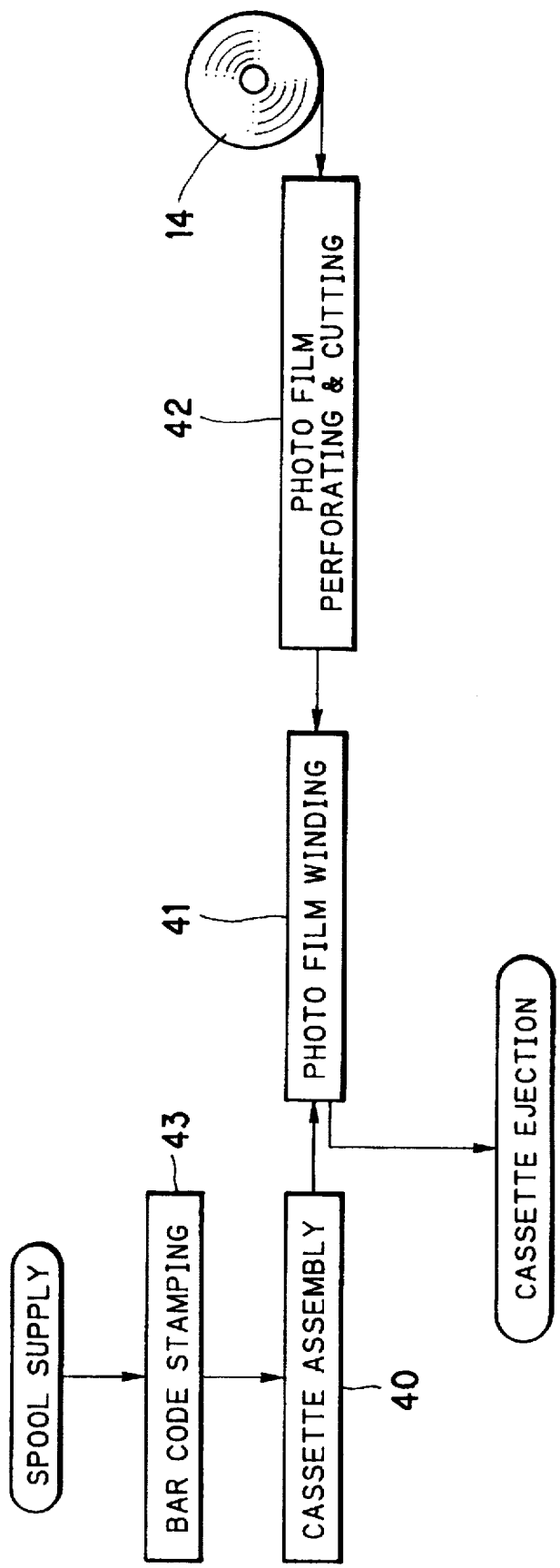
FIG. 5 is an explanatory view schematically illustrating a method of assembling parts of the cassette.

To assemble parts of the photo film cassette, the cassette shell 10 is constructed in a cassette assembly process 40 and sent to a photo film winding process 41 as illustrated in FIG. 5. The photo film winding process 41 is provided with the photo film 14 having been shaped at the length predetermined for the maximum number of the frames. In the photo film winding process 41, the photo film 14 is wound into the cassette shell 10 to produce the photo film cassette. Thereafter the photo film 14 is partially drawn from the roll in the cassette shell 10, and worked in a photo film perforating/cutting process 42.

In a bar code stamping process 43, the spool 13 is provided with the bar code 28 on the data disk 27. The spool 13 is then transferred to the cassette assembly process 40, where the disks 19 and 20 are mounted on the spool 13, which is inserted into the cassette shell 10.

Figure 6:
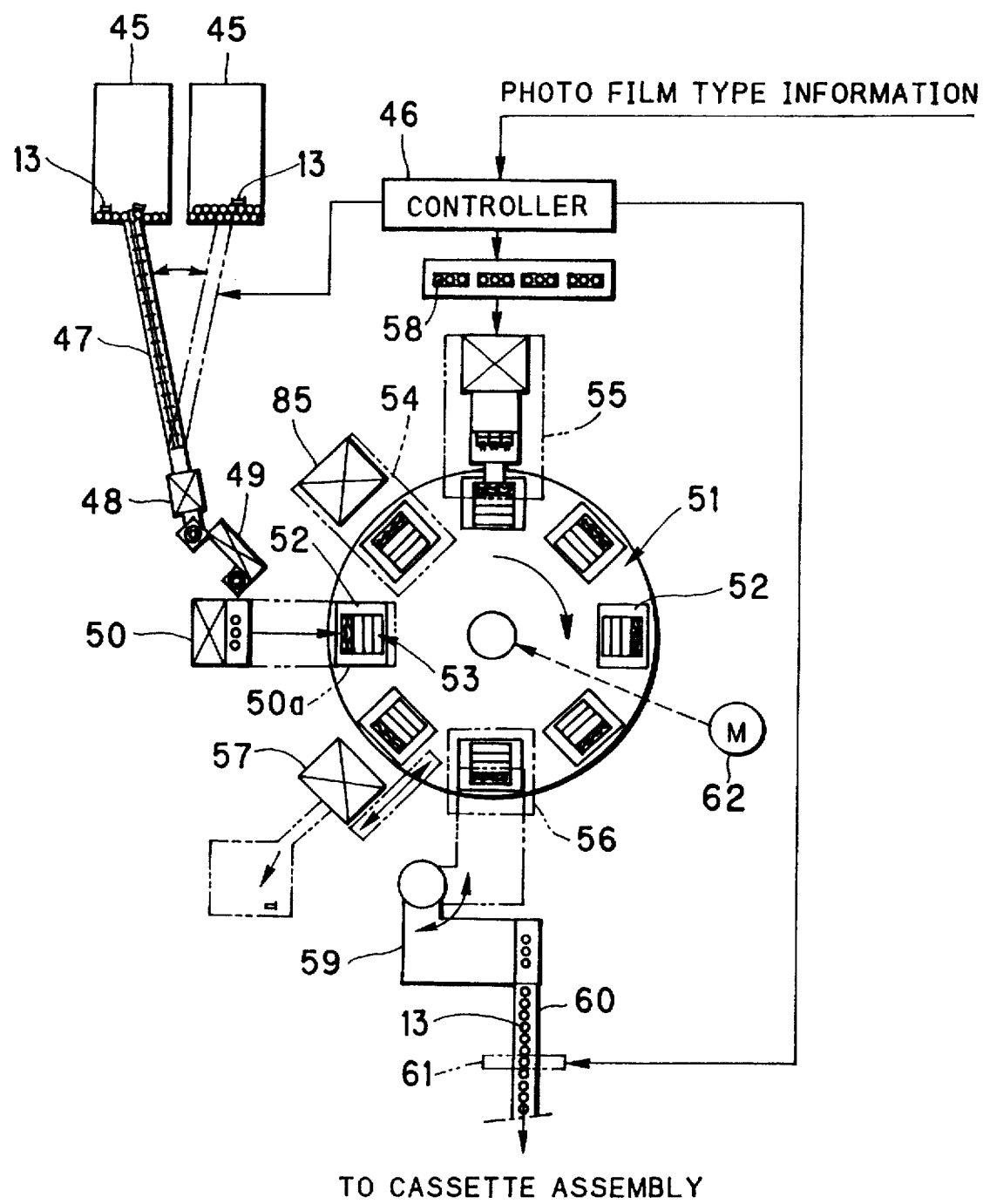
FIG. 6 is an explanatory view illustrating a process of printing a bar code.

In the bar code stamping process 43, a plurality of spool hoppers 45 contain the spool 13 in classification of the photo film types, as illustrated in FIG. 6. A controller 46, as a determiner to control the bar code stamping process 43, receives transmittance of photo film type information based on instruction of cassette production. A spool supply chute 47 cooperates with the spool hoppers 45 to constitute a spool supplier, is constructed changeable between the spool hoppers 45, and is shifted in accordance with the photo film type information and set at one of the spool hoppers 45, from which the spool 13 of only one selected type is supplied. The spools 13 are moved successively along the spool supply chute 47 in an axially regular orientation, and erected by a spool dropper 48 to direct the data disk 27 upwards. A spool transferrer 49 supplies the spools 13 from the spool dropper 48 to positions in a spool setter 50 one after another while keeping the erected orientation. The spool setter 50 stands by for the supply of the three spools 13 to the positions, and then sets them at one time to an indexing table 51 as an intermittent conveyor. Note that the spool dropper 48 and the spool transferrer 49 cooperate as orientation regulator.

On the indexing table 51 are arranged plural pallets, for example eight pallets 52 rotationally at regular pitch. Each of the pallets 52 has a spool holder group 53. The spool holder group 53 supports three spools 13 at one time. Each spool 13 on the spool holder group 53 is conveyed from a spool setting station 50a to a phase regulating station 54, a bar code recording station 55 and a spool removing station 56 by rotation of the indexing table 51 according to a tact system and by means of a motor 62.

A phase regulator 85 is disposed in the phase regulating station 54. The phase regulator 85 rotates the spools 13, and changes orientation of the greater radial sector 27a of the data disk 27 to direct it towards the outside of the indexing table 51.

The bar code recording station 55 includes three hot stamping heads 58 which respectively have printing plates, layer foil in the form of the high-level pattern 28a on the data disk 27 to shape the bar code 28. Photo film type information is sent to the bar code recording station 55 by a transmission device in synchronism with supply of the spools 13. The printing plates of the hot stamping heads 58 are a type selected from a plurality of previously prepared types. When the photo film type is changed, a new type of printing plates of the hot stamping heads 58 is selected and set automatically in accordance with the photo film type information.

In the spool removing station 56 is disposed a spool remover 59. The spool remover 59 ejects the three spools 13 at one time from the spool holder group 53 to an ejecting conveyor 60. The ejecting conveyor 60 conveys the spools 13 toward the photo film winding process 41 while keeping the spools 13 erected and oriented for the greater radial sector 27a to have the regular direction. On the spool remover 59 is disposed an inspecting station having a bar code reader 61. The bar code reader 61 consists of an image recognition device, reads the bar code 28 from the data disk 27, and inspects the bar code 28 for a quality of the bar code 28. The bar code reader 61 also compares data of the bar code 28 with the photo film type information as transmitted, and inspects for coincidence and acceptability of the bar code 28.

There is an additional spool removing station 57 disposed next to the spool removing station 56. The additional spool removing station 57 is used when the spools 13 have been supplied to the indexing table 51 not consecutively but only as one of three spools or less. There are three buffers arranged between the bar code recording station 55 and the spool removing station 56 in a space as much as three stations. It is possible to add other one, two or three bar code recording stations when desired for greater productivity.

Figure 7:
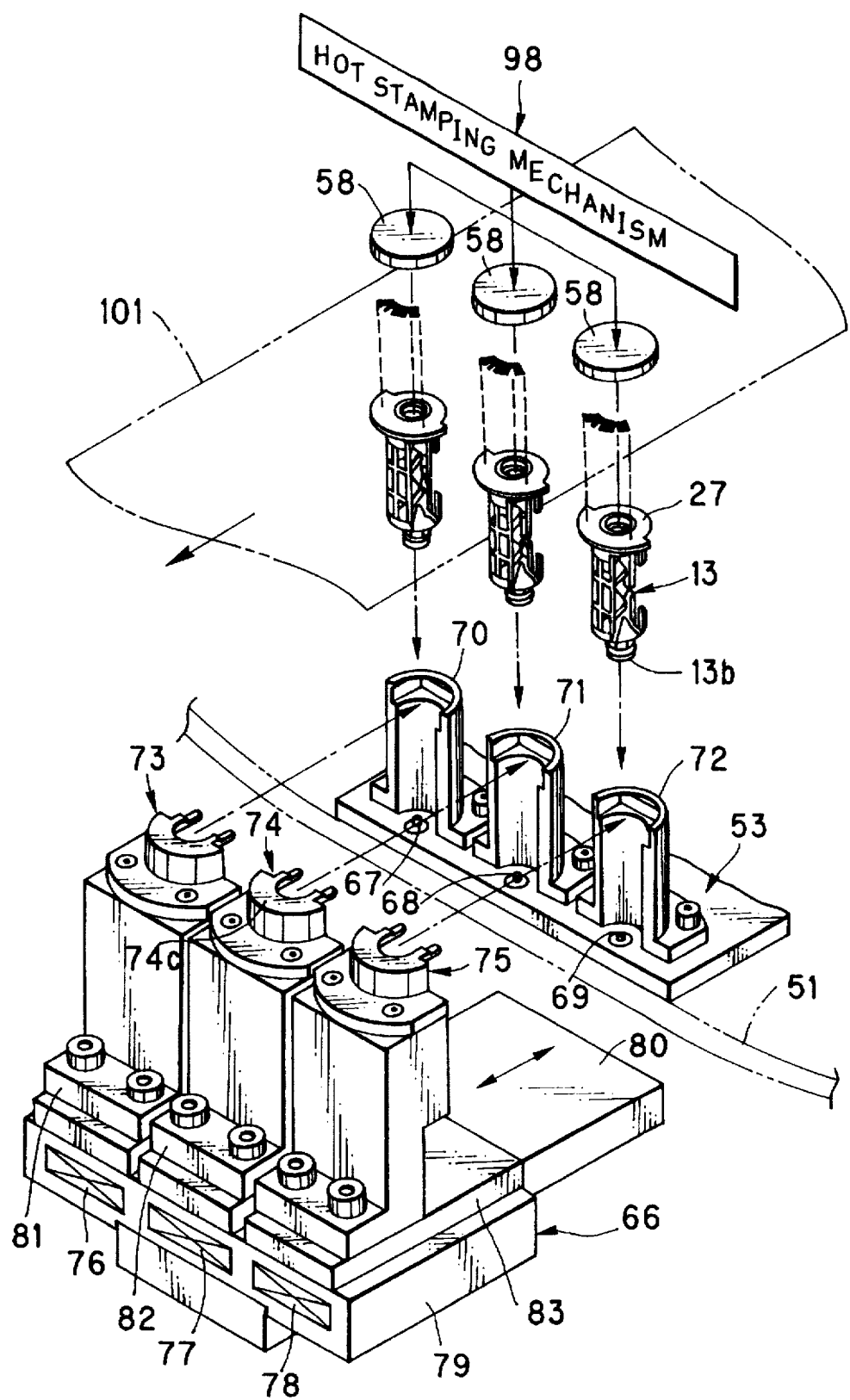
FIG. 7 is an explanatory view illustrating a hot stamping apparatus.
Figure 8:
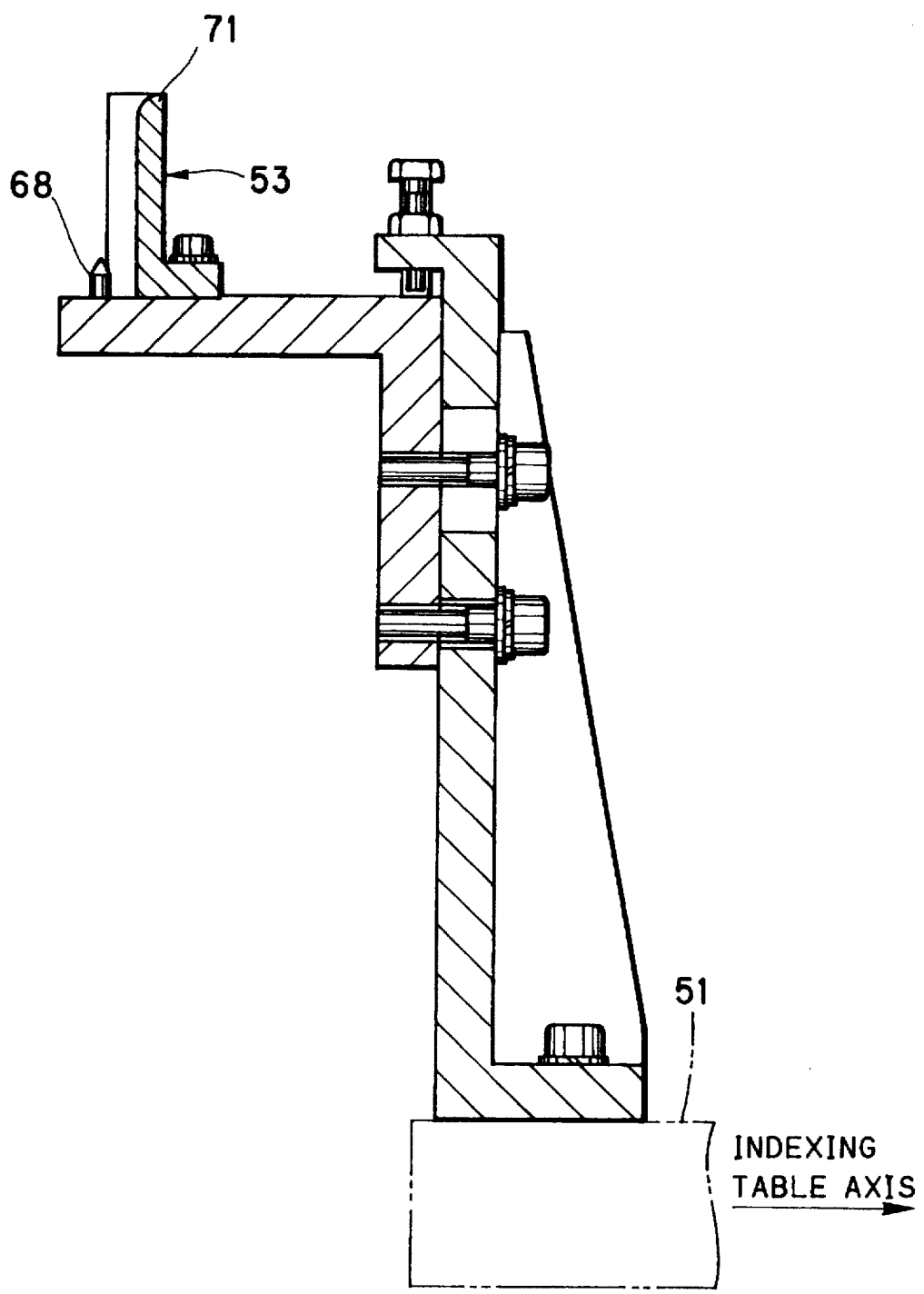
FIG. 8 is a vertical section illustrating a spool holder.

As illustrated in FIGS. 7 and 8, support shafts 67, 68 and 69 are arranged on the spool holder group 53 at a given pitch in a direction perpendicular to a radius of the indexing table 51. The support shafts 67–69 are arranged in a vertically erect manner, and have tops shaped like pins engageable with circular hole portions of the key boss 13b of the spools 13. The spool setter 50 provides the support shafts 67–69 with the three spools 13 in a vertically downward direction. The spools 13 are kept erect to direct the data disk 27 upwards.

There are spool holders 70, 71 and 72 as walls formed to stand respectively about the support shafts 67, 68 and 69. When the spool holders 70–72 respectively support the spools 13, a top of the spool holders 70–72 is as high as a top face of the data disk 27. The spool holders 70–72 allow the spools 13 to move in the axial direction, and keep the spools 13 from falling down in directions crosswise to the axial direction.

Figure 9:
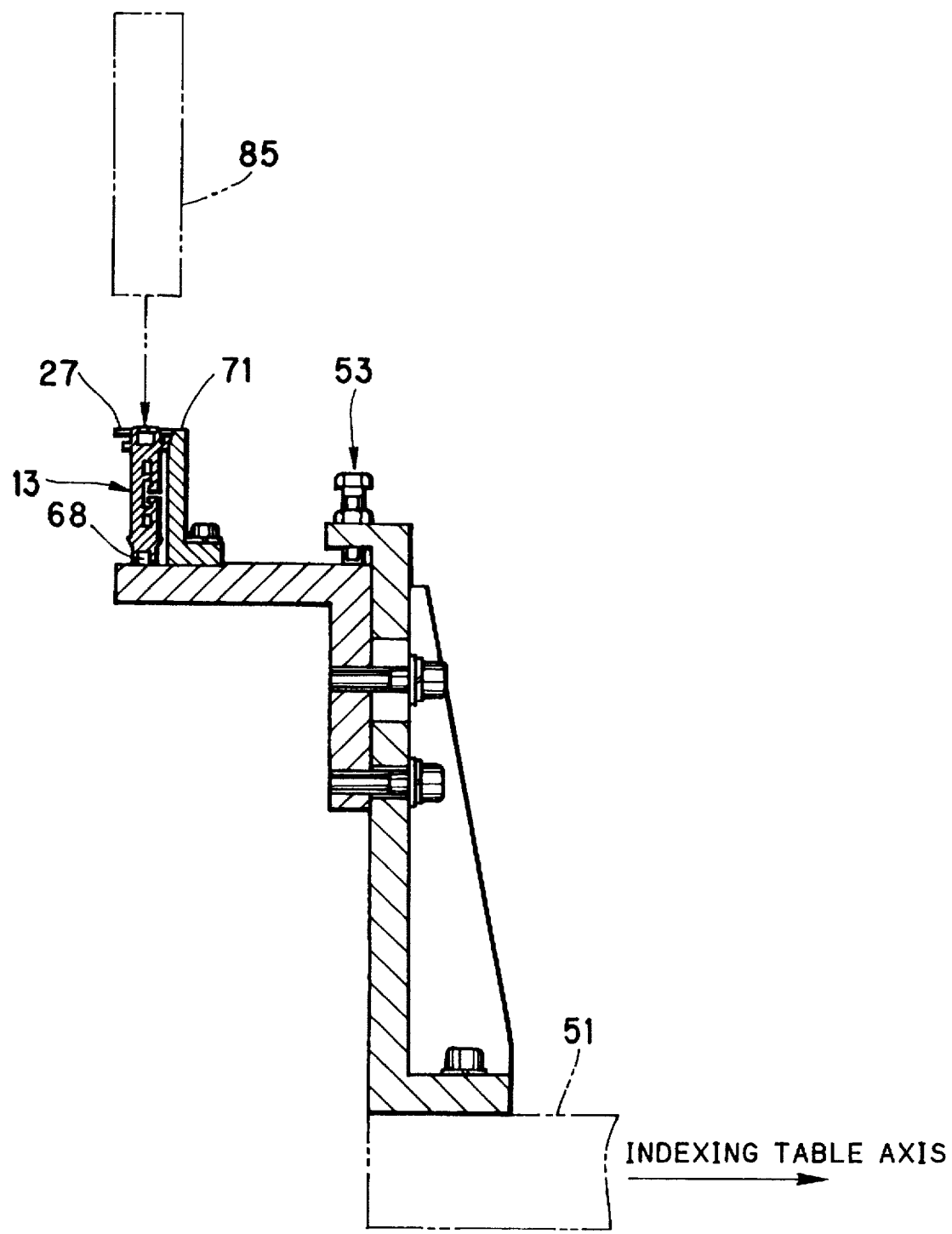
FIG. 9 is a vertical section illustrating the spool holder in a station for phase regulation.
Figure 10:
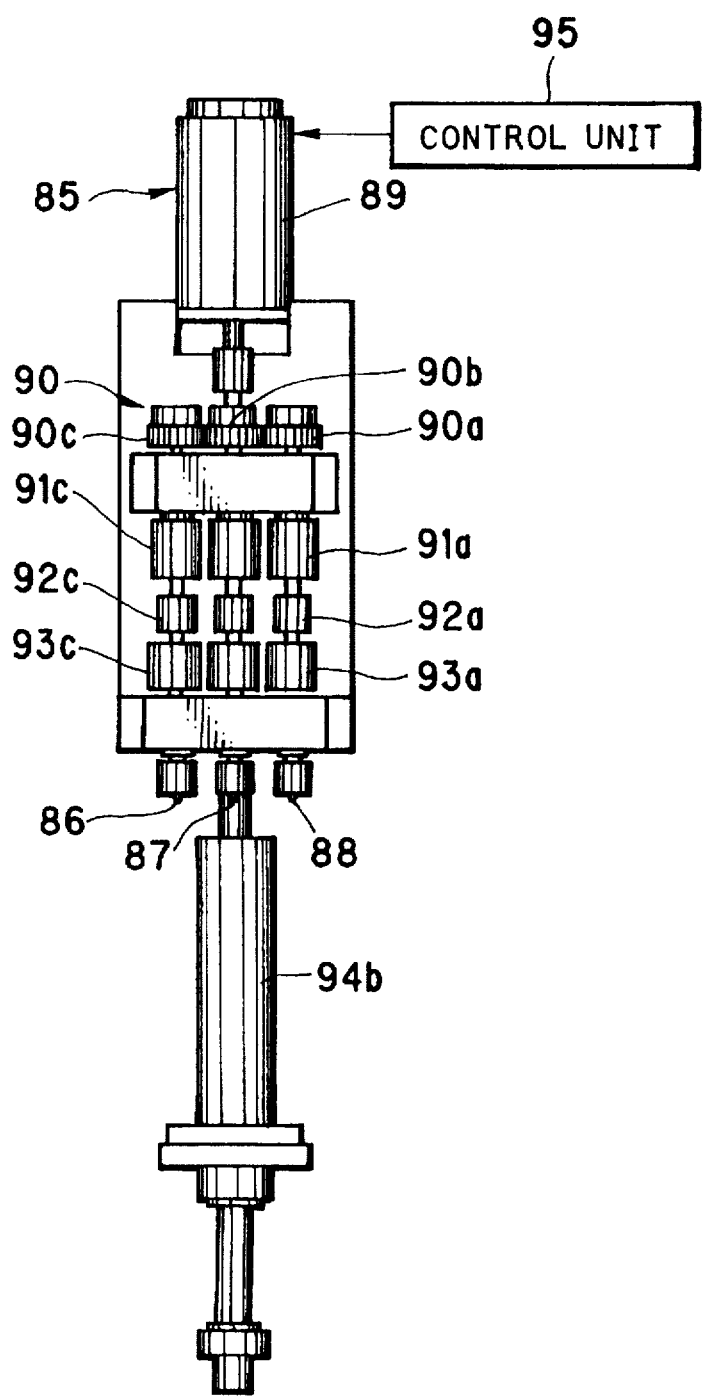
FIG. 10 is a front elevation illustrating a phase regulator which rotates the spool.
Figure 11:
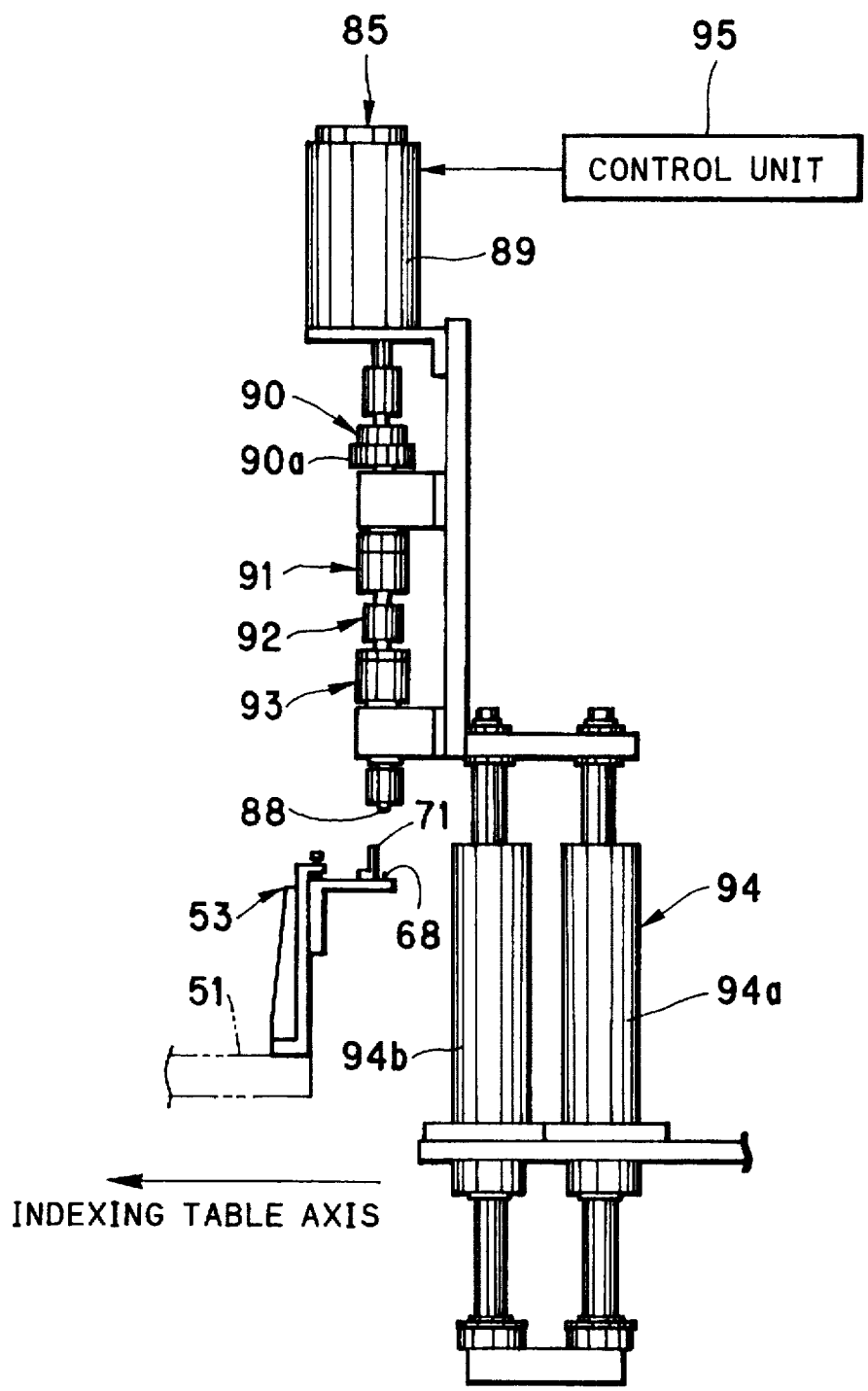
FIG. 11 is a side elevation illustrating the phase regulator.

In FIGS. 9, 10 and 11, the phase regulator 85 engages drive shafts 86, 87 and 88 with the key boss 13a of the spools 13 supported in the spool holder group 53. The drive shafts 86–88 are driven to rotate, to orient the greater radial sector 27a of all the spools 13 toward the outside of the indexing table 51.

In FIGS. 10 and 11, the phase regulator 85 includes a drive device, the drive shafts 86–88, a shaft retractor 93, a shaft coupler 94 and a control unit 95. The drive device includes a stepping motor 89, a gear train 90, a torque regulator group 91 and a flexible coupling set 92. The gear train 90 includes gears 90a–90c, to which rotation of the stepping motor 89 is transmitted, and which are rotated in synchronism. Torque regulators 91a–91c receives outputs of the gears 90a–90c, regulates the torque in a constant level, and transmits the torque to the flexible coupling set 92. Each of shaft retractors 93a–93c is constituted of a vertical slidable bearing and a holder spring. The vertical slidable bearing supports each of the drive shafts 86–88 in a vertically movable manner. The holder spring biases the drive shafts 86–88.

Flexible couplings 92a–92c transmit rotation of the torque regulators 91a–91c to the drive shafts 86–88 being vertically slidable. The shaft coupler 94 is constituted by two cylinders 94a and 94b, which shift the drive device between engaged and disengaged positions of the drive shafts 86–88. In the engaged position, the drive shafts 86–88 are engaged with the key boss 13a of the spools 13. In the engaged position, the drive shafts 86–88 are away from the key boss 13a of the spools 13.

The drive shafts 86–88 respectively associated with the support shafts 67–69, and have a shape engageable with the key boss 13a in a manner coaxially with the support shafts 67–69. The control unit 95 controls the stepping motor 89 to rotate the spools 13 for the orientation of the greater radial sector 27a to the outside of the indexing table 51. The control unit 95 also controls the shaft coupler 94.

When the shaft coupler 94 is actuated, there is a possibility of lack of coincidence between the key boss 13b of the spools 13 and the drive shafts 86–88. Then the shaft retractor 93 operates to move the drive shafts 86–88 upwards against the holder spring. Before the stepping motor 89 rotates for the phase regulation of the spools 13, the control unit 95 controls the stepping motor 89 to make one or less rotation of the drive shafts 86–88 for the purpose of engagement of the drive shafts 86–88 with the key boss 13a.

Figure 12:
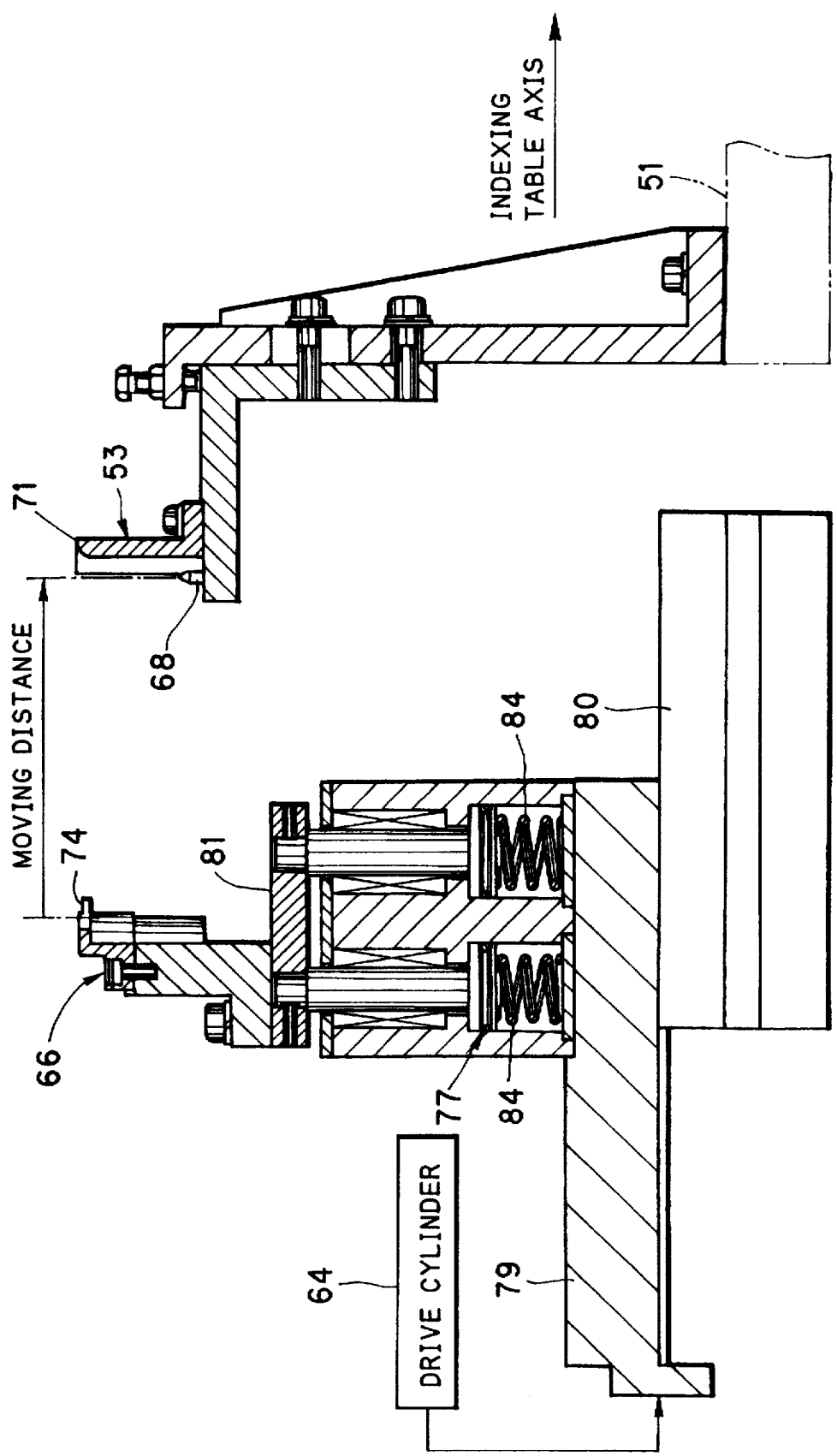
FIG. 12 is a vertical section illustrating a bar code recording station having shiftable disk supports.

In FIGS. 7 and 12, the bar code recording station 55 has a shifting holder 66 as a shifter mechanism. The shifting holder 66 includes three disk supports 73, 74 and 75 respectively having two claw portions, and includes three cushion springs 76, 77 and 78. The claw portions constitute a fork. Those are mounted on a slider 79 or slidable table. The slider 79 is slidable in a direction of guide rails 80 fixed in a radial direction of the indexing table 51. The disk supports 73–75 are moved by a drive cylinder 64 between an advanced position advanced into the spool holders 70–72 and a retracted position away from the spool holders 70–72. The drive cylinder 64 operates as a shifter mechanism.

The disk supports 73–75 have a flat top 74c slightly higher than the 70–72. When the slider 79 comes to the advanced position to the spool holders 70–72, the disk supports 73–75 are moved in the crosswise direction of the spools 13 supported on the spool holder group 53 and to the bottom face of the data disk 27, so that claw portions 74b receive insertion of the spool core 13c of the spools 13. Also an inclined face 74a of the disk supports 73–75 in FIG. 12A lifts the data disk 27 in the axial direction. Tips of the claw portions 74b of the disk supports 73–75 have a small thickness. The spools 13 are lifted in a range short of a range enough for disengagement from the support shafts 67–69, and are supported on the shifting holder 66. Note that a reference sign θ (theta) represents an angle of inclination of the inclined face 74a.

Fork stand members 81, 82 and 83 respectively support the disk supports 73–75. The fork stand members 81–83 are movable vertically between upper and lower positions. When the fork stand members 81–83 have the upper position, the flat top 74c of the disk supports 73–75 is respectively slightly higher than a top of the spool holders 70–72. When the fork stand members 81–83 have the lower position, the flat top 74c of the disk supports 73–75 is slightly lower than the top of the spool holders 70–72. The fork stand members 81–83 are biased upwards by the cushion springs 76–78. The cushion springs 76–78 operate as a cushion for the disk supports 73–75 to regularize the stamping pressure applied to the data disk 27 lifted by the disk supports 73–75 while the foil is stamped in the bar code recording station 55. It is to be noted that the cushion springs 76–78 are preferably disposed in an equilibrated manner relative to the stamping pressure to the data disk 27. Each of the cushion springs 76–78 can be constituted from two compression springs 84 as illustrated in FIG. 12, and may include compressed air, a hydraulic structure, gas and compressing springs, and a combination of two or more of those structure.

Figure 13:
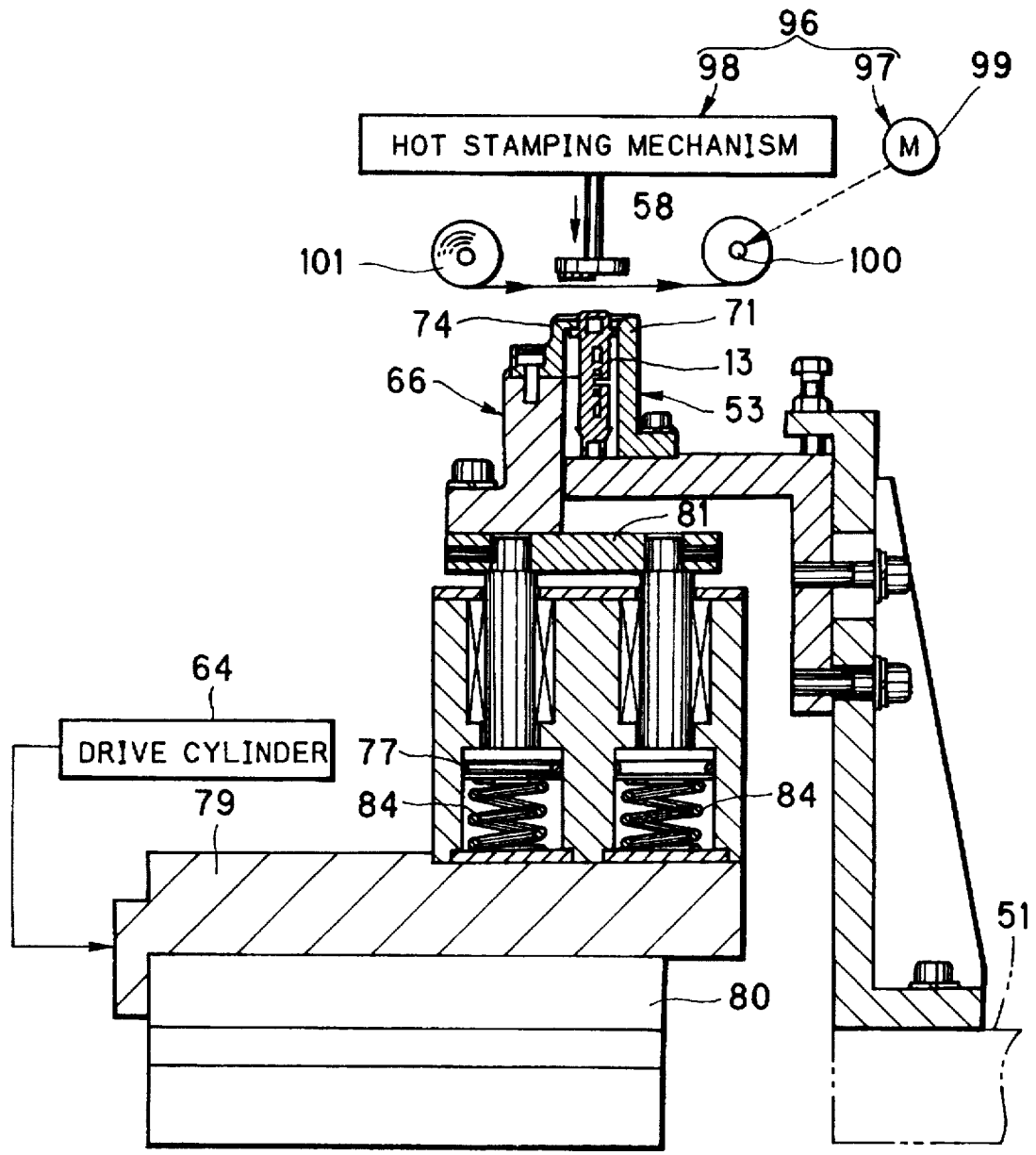
FIG. 13 is a vertical section illustrating the disk support advanced to a data disk of the spool.

In FIG. 13, the bar code recording station has a stamping film feeder 97 and a hot stamping mechanism 98. The stamping film feeder 97 drives a motor 99 to rotate a winding reel 100, and draw a foil stamping film 101 in a position directly over the data disk 27 of the spools 13 on the shifting holder 66. The foil stamping film 101 has a width slightly greater than a length of arrangement of the three spools 13 on the shifting holder 66, and is moved in a sliding direction of the shifting holder 66 along a radius of the indexing table 51. After the hot stamping, the foil stamping film 101 is wound on the winding reel 100.

The hot stamping mechanism 98 consists of a unit for the hot stamping, and effects the hot stamping by pressing the hot stamping heads 58 against the data disk 27 with the foil stamping film 101, to form the bar code 28 at one time on the three spools 13 supported by the shifting holder 66. The foil stamping film 101 consists of coatings of a release layer, a protective layer, a metal deposited layer and an adhesive layer formed in a support in the order listed. A rear of the foil stamping film 101 is pushed, so that the release layer and the layers succeeding thereto remain on the data disk 27 after removal of the foil stamping film 101, and are transferred to the data disk 27. The support after the stamping is withdrawn. Note that the hot stamping heads 58 are relief printing plates and formed of brass. The metal deposited layer is preferably formed of aluminum. It is alternatively possible to use the hot stamping heads 58 formed from silicone rubber or fluororubber.

The operation of the above construction is hereinafter described. The photo film type information is input to the controller 46. The controller 46 changes over the spool supply chute 47 according to the photo film type information, and selects one of the spool hoppers 45. The controller 46 sends the photo film type information to the bar code recording station 55.

When a system start command is entered, the controller 46 causes the spool hoppers 45 to supply the spools 13 to the spool dropper 48 through the spool supply chute 47. In the spool dropper 48, the spools 13 are erected to direct the data disk 27 upwards. The spool transferrer 49 transfers the spools 13 to a position in the spool setter 50. The spool setter 50 moves the spools 13 to the spool holder group 53 placed in the spool setting station 50a.

The spools 13 are set to the support shafts 67–69 in the vertical direction, so that the support shafts 67–69 are engaged with the key boss 13b. The top of the data disk 27 becomes as high as the top of the spool holder 71.

When the spool setter 50 finishes movement of the spools 13, the spool setter 50 sends a SET FINISH signal to the controller 46. The controller 46 causes the indexing table 51 to make intermittent rotation. Then the spools 13 are set in the phase regulating station 54, where the control unit 95 actuates the cylinders 94a and 94b of the shaft coupler 94 to engage the drive shafts 86–88 with the key boss 13a as illustrated in FIGS. 9–11. If at least one of the drive shafts 86–88 should not be engaged with the key boss 13a, the drive shafts 86–88 are driven to move upwards. The control unit 95 drives the stepping motor 89 to cause the drive shafts 86–88 to make one rotation. Then all of the drive shafts 86–88 are finally inserted in the key boss 13a.

The control unit 95 rotates the stepping motor 89 by the predetermined amount, to orient the greater radial sector 27a of the spools 13 regularly toward the outside of the indexing table 51 in rotational fashion. As the drive device has the gear train 90, the drive shafts 86–88 are rotatable without deviation from a rotational position of the stepping motor 89. The drive shafts 86–88 are regulated to have a common rotational position between their keys. The rotational position of the drive shafts 86–88 is previously associated with an original position of the stepping motor 89. The stepping motor 89 is then supplied with a predetermined number of pulses to rotate the spools 13 in the predetermined direction. The spools 13 are regulated to direct the greater radial sector 27a in the common direction. Then the cylinders 94a and 94b of the shaft coupler 94 are actuated to move the drive shafts 86–88 to the retracted position, to finish the phase regulating operation for the spools 13.

When the operation in the phase regulating station 54 is finished, the control unit 95 sends a REGULATION FINISH signal to the controller 46. The controller 46 causes the indexing table 51 to make intermittent rotation. The spools 13 after the phase regulation of the data disk 27 are set in the bar code recording station 55. The bar code recording station 55 has the hot stamping heads 58 for the photo film type information.

Figure 14:
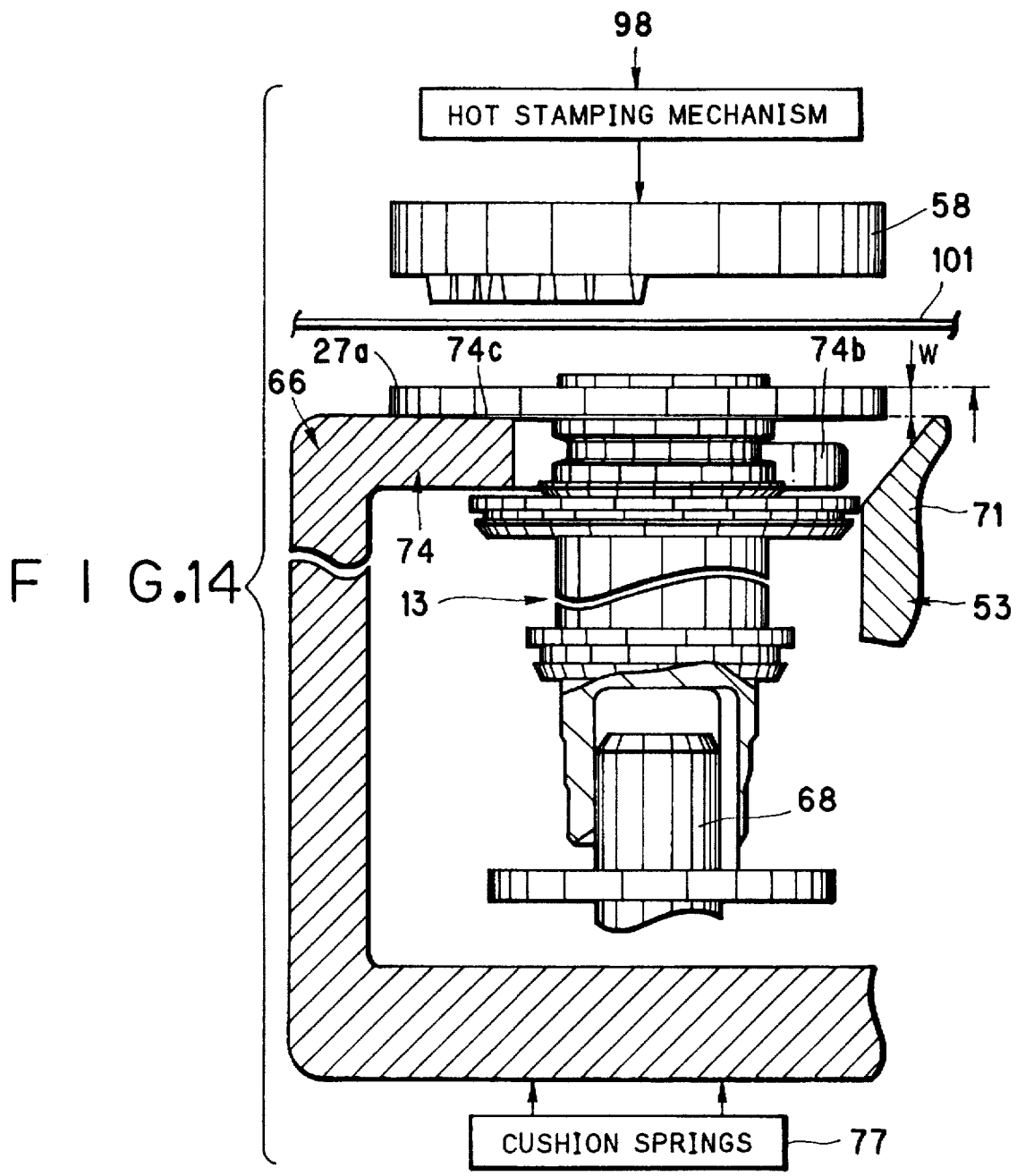
FIG. 14 is an explanatory view illustrating the disk support raising the data disk of the spool.

The controller 46, after rotating the indexing table 51, sends a STAMPING STANDBY signal to the drive cylinder 64 of the bar code recording station 55. Responsively the drive cylinder 64 moves the slider 79 to the advanced position. The disk supports 73–75 are moved to the bottom face of the data disk 27 of the spools 13. As illustrated in FIG. 14, the flat top 74c of the disk supports 73–75 lifts each of the spools 13. The spools 13 are lifted by an amount H of FIG. 12A within a range where the spools 13 are not moved away from the support shafts 67–69.

When the slider 79 finishes moving, the drive cylinder 64 sends a MOVEMENT FINISH signal to the hot stamping mechanism 98. In response to the signal, the hot stamping mechanism 98 lowers the hot stamping heads 58, and presses the hot stamping heads 58 respectively against the data disk 27 with the foil stamping film 101 for a predetermined time. If the stamping pressure to the data disk 27 should be irregular, there would occur defects such as partial breakage of the foil and burr on the edge of the foil. However the disk supports 73–75 are individually cushioned by the cushion springs 76–78, so that the stamping pressure to the data disk 27 can be regularized. The quality of the hot stamping is raised. The cushion springs 76–78 absorb of shock of the stamping, so that no damage occurs to the data disk 27. Then the hot stamping mechanism 98 releases the hot stamping heads 58 from being pushed, and sends a STAMPING FINISH signal to the controller 46. The controller 46 causes the indexing table 51 to make intermittent rotation, to set the spools 13 in the spool removing station 56. In the meantime the stamping film feeder 97 sends the foil stamping film 101 by an amount as predetermined.

Cycle time of the bar code recording station 55 is determined in consideration of the following:

Intermittent rotating time of the indexing table 51: 0.4 second;

Plate lowering time of the hot stamping heads 58: 0.4 second;

Stamping time: 0.3 second (preferably 0.3–0.6 second, while heater temperature of the hot stamping heads 58 is 150°–200° C., preferably 170°–190° C.);

Cooling time: 1.5 seconds (preferably 0.3–1.5 seconds);

Plate raising time: 0.4 second;

Feeding time for the foil stamping film 101: 0.2 second.

The cycle time as a total of those values is 3–3.4 seconds, also in consideration of overlap.

The controller 46 causes the indexing table 51 to make intermittent rotation, and sends a REMOVAL STANDBY signal to the spool remover 59 of the spool removing station 56. The spool remover 59 responsively captures the three spool 13 at one time from the spool holder group 53, and exits the spools 13 to the ejecting conveyor 60 in an arrangement directed in the direction of the ejecting conveyor 60. The spools 13 on the ejecting conveyor 60 are sent to the bar code reader 61 while the data disk 27 of the spools 13 is directed regularly. In the bar code reader 61, the bar code 28 of the spools 13 is read through an image recognizing device and inspected for bar code quality. Data as read in the bar code reader 61 is compared with the photo film type information being transferred, for judgment of acceptability of the spools 13. If one of the spools 13 is detected as unacceptable, it is removed and ejected. Only acceptable ones of the spools 13 are sent toward the cassette assembly process 40. Note that it is possible instead of the image recognizing device to use a bar code reading sensor.

Figure 15:
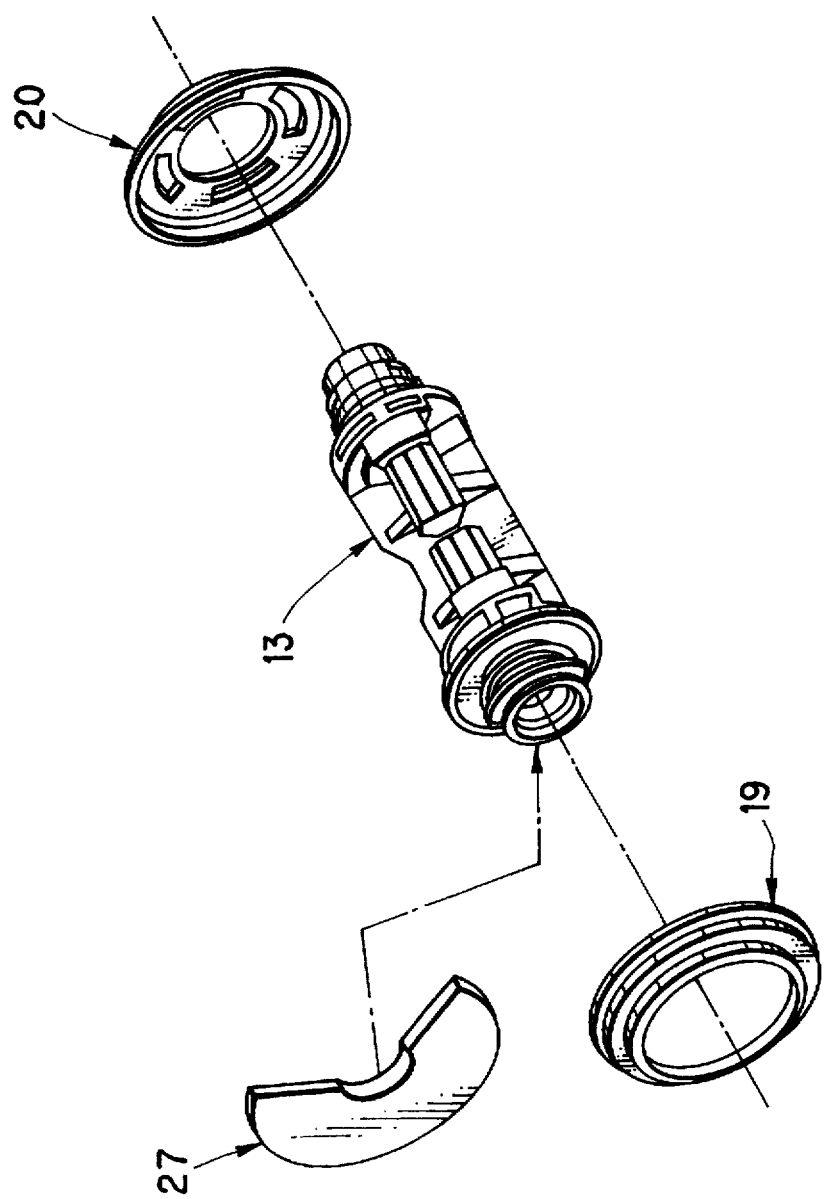
FIG. 15 is an exploded perspective illustrating another preferred spool in which a data disk is initially separate and is fitted to a core of the spool.

In the above embodiment, the spools 13 have the data disk 27 formed integrally therewith. The present invention is also applicable to the data disk 27 having the greater radial sector 27a prepared separately from the spools 13 in FIG. 15. The greater radial sector 27a as a single piece has an engaging portion shaped with a C-recess. The C-recess is fitted to the spools 13 by movement crosswise to the spools 13, to combine the greater radial sector 27a with the smaller radial sector 27b constitute the data disk 27. It is possible for the disk supports 73–75 to support the data disk 27 of the spools 13. There occurs no error of separating the data disk 27 during the hot stamping, so that the bar code 28 is reliably formed in the manner similar to the above construction. This structure is also favorable in that the disk 19 can be mounted on the spools 13 by movement directed opposite to that for the disk 20, not by movement directed equally that for the disk 20. The assembly machine and operation of the disks 19 and 20 can be designed differently with more degrees of freedom.

In the above embodiment, the three spools 13 are arranged together and subjected to the hot stamping at one time. The present invention is applicable to the hot stamping of one spool at one time, or two or four or more spools at one time. The spool holder group 53 is used only in the bar code recording station 55, but may be disposed in association with the shifting holder 66. The pallets are rotated on the indexing table 51 in the endless manner. The present invention is applicable to recording of the bar code by conveying plural pallets along a straight line, for example by means of a conveyor belt.

In the above embodiment, the data disk 27 has a shape constituted by combination of two sectors. The present invention is applicable to a data disk of a circular shape, a polygonal shape or any other shape as designed.

In the above embodiment, the data disk 27 is oriented upwards while subjected to the hot stamping in the spool holder 71. The present invention is applicable to the hot stamping in which the data disk 27 is oriented downwards but the spool core 13c is erect. Of course the present invention is applicable to the hot stamping of the bar code 28 to a surface of the data disk 27 directed to the roll of the photo film 14, not the surface opposite to the roll.

In the present invention, structures other than the above-described photo film cassette may be used. Typical examples usable in the present invention are hereinafter referred to. Of course the present invention is not limited to those examples, but can be combined with any known construction.

The following techniques are used for producing the photo film 14 with a magnetic recording layer: JP-A 6-35118 and 6-17528 and *Bulletin of Disclosed Techniques of the Association of Invention (Hatsumei Kyokai Kokai Giho)* 94-6023 disclose a thermally pretreated thin polyester support, for example, a polyethylene aromatic dicarboxylate type of polyester support as a support of the photo film 14. The polyester support is 50–300 μm thick, preferably 50–200 μm thick, more preferably 80–115 μm thick, and desirably 85–105 μm thick, and is thermally treated or "annealed" for 1–1500 hours under a temperature lower than a glass transition temperature of the polyester support. According to JP-B 43-2603, 43-2604 and 45-3828, ultraviolet rays are applied to the polyester support for the surface treatment. According to JP-B 48-5043 and JP-A 51-131576, surfaces of the polyester support are treated by effecting corona discharge. According to JP-B 35-7578 and 46-43480, the surfaces of the polyester support are treated by effecting glow discharge. According to U.S. Pat. No. 5,326,689, an undercoat is applied to the polyester support. If necessary, an undercoat according to U.S. Pat. No. 2,761,791 is applied to the polyester support. According to JP-A 59-23505, 4-195726 and 6-59357, a coating of particles of strong magnetic material is applied to the polyester support.

As disclosed in JP-A 4-124642 and 4-124645, a layer of the magnetic material may be arranged like stripes. According to JP-A 4-62543, the polyester support is treated for an antistatic characteristic if desired. Finally a coating of silver halide emulsion is applied thereto. JP-A 4-166932, 3-41436 and 3-41437 disclose examples of the silver halide emulsion.

A production managing method of JP-B 4-86817 for photo sensitive material can be preferably used in the production. A data recording method of JP-B 6-87146 can be used for recording the manufacturing data. A photo film producing method of JP-A 4-125560 is preferable in a step before or after the production managing step. The film material is cut into the photo film strip with a width smaller than that of the 135 size. Perforations along one of edges are formed so that two of them are associated with each of frames, of which a format is smaller than a frame of a full size of the 135 type.

The strip of the photo film as produced is contained in a cassette, cartridge, patrone or the like to be used: the cartridge package disclosed in JP-A 4-157459; the cartridge depicted in FIG. 9 of JP-A 5-210202 (corresponding to U.S. Pat. No. 5,363,166); and the cassette of U.S. Pat. Nos. 4,221,479, 4,834,306, 5,226,613 and 4,846,418.

The structures of U.S. Pat. Nos. 4,848,693 and 5,317,355 are favorable as cassette in which the leader is pre-contained, in view of light-shielding performance. U.S. Pat. No. 5,296,886 discloses a lock mechanism preferably usable with the cassette. U.S. Pat. No. 5,347,334 discloses an indication preferably to display a degree of use of the photo film in the cassette. Also there is a preferable known cassette having a structure capable of avoiding double exposures. The structure of EP-A 0 582 852 (corresponding to JP-A 6-35123) may be used, in which photo film can be readily loaded in a cassette as soon as the photo film is simply inserted into the cassette.

The photo film cassette can be used for numerous purposes of photography, development and various manners of using photographs, by means of a camera, a photo film processor, and other optical instruments of a photo laboratory. As examples, JP-A 6-8886 and 6-99908 disclose cameras of simple loading types. JP-A 6-57398 and 6-101135 disclose cameras of automatic photo film winding types. JP-A 6-205690 discloses a camera in which the photo film can be removed during operation of using the photo film for a number of exposures. JP-A 5-293138 and 5-283382 disclose magnetic information recording cameras of a printing aspect ratio selectable type, namely a camera in which information of panoramic photography, wide-vision size photography or normal size photography can be magnetically recorded to photo film. JP-A 6-101194 discloses a camera capable of avoiding double exposures. JP-A 5-150577 discloses a camera capable of externally indicating a used status of photo film.

The photo film after taking exposures is developed by one of automatic photo film processors according to JP-A 6-222514 and 6-222545. JP-A 6-95265 and 4-123054 disclose methods of magnetic recording on photo film, which methods can be utilized before or after the development. Selection of an aspect ratio according to JP-A 5-19364 can be also used. If the photo film processor is a motion picture photo film type, the method disclosed in JP-A 5-119461 is used for splicing the photo film. When or after the photo film is developed, the photo film is attached or detached according to JP-A 6-148805.

After the photo film processing, the methods of JP-A 2-184835, 4-186335 and 6-79968 may be used for conversion of the photo film information to a printable form to a front face or a back face of color paper. The methods of JP-A 5-11353 and 5-232594 may be used for returning the photo film to a customer with an index print or a returning cartridge. The image input apparatus of Japanese patent applications Nos. 5-327194 and 6-9063 may be used in combination with the returning cartridge.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A hot stamping apparatus for recording a bar code on a data disk, wherein said data disk is disposed near to an axial end of a core of a spool, and said spool is used for winding photo film about said spool core to be contained in a cassette in rotatable fashion, said hot stamping apparatus comprising:

at least one spool holder means for holding said spool in a slidable manner while said spool core is erect and said data disk is oriented upwards;

disk support means for supporting said data disk;

shifter means for shifting said disk support means between a retracted position away from said spool holder means and an advanced position close to said spool holder means, said data disk support means, in said advanced position, adapted for lifting said data disk by contact with a bottom of said data disk;

a hot stamping head, adapted to be pressed against a top of said data disk, for recording a bar code thereto while said data disk is supported on said disk support means; and cushion means for biasing said disk support means up toward said hot stamping head.

2. A hot stamping apparatus as defined in claim 1, wherein said disk support means includes a flat portion having an edge, said flat portion being contacted on said bottom of said data disk, and an arc-like cutout which is formed in said flat portion and into which said spool core is receivable.

3. A hot stamping apparatus as defined in claim 2, wherein said disk support means further includes two claws protruded from said edge of said flat portion, said claws constituting a fork with said flat portion, said claws for receiving said spool core therebetween and located away from said data disk.

4. A hot stamping apparatus as defined in claim 3, wherein said edge of said flat portion is inclined for smoothly avoiding collision between said flat portion and said data disk.

5. A hot stamping apparatus as defined in claim 4, wherein said at least one spool holder means comprises plural spool holder means, and each of said spool holder means is associated with said disk support means, said hot stamping head, and said cushion means.

6. A hot stamping apparatus as defined in claim 5, wherein said shifter means includes:

a slider for moving substantially in a horizontal direction; and a fork stand member disposed on said slider in cooperation with said cushion means, said fork being mounted on a top of said fork stand member.

7. A hot stamping apparatus as defined in claim 6, wherein said cushion means includes a coil spring.

8. A hot stamping apparatus as defined in claim 7, wherein said data disk is at least one of secured to said spool core and formed with said spool core.

9. A hot stamping apparatus as defined in claim 6, further comprising:

a rotatable indexing table;

plural pallets arranged on said indexing table at a predetermined angle, each pallet having two or more of said spool holders arranged side by side;

a spool setting station disposed at said rotatable indexing table;

a bar code recording station disposed at said rotatable indexing table and downstream from said spool setting station;

a spool removing station disposed at said rotatable indexing table and downstream from said bar code recording station; and rotating means for rotating said indexing table to move said pallets past said spool setting station, said bar code recording station and said spool removing station in sequence, said spool setting station being adapted to setting plural spools respectively at said spool holder means, said bar code recording station being adapted to recording said bar code to said data disk with said hot stamping head, and said spool removing station being adapted to removing said spools from said spool holder means.

10. A hot stamping apparatus as defined in claim 9, further comprising:

a bar code reader for reading said bar code from said data disk while said spools removed from said spool holder means are conveyed; and determiner means for determining correctness of said bar code in accordance with a result of reading of said bar code reader.

11. A hot stamping apparatus for recording a bar code on a data disk, wherein said data disk is disposed near to an axial end of a core of a spool, and said spool is used for winding photo film about said spool core to be contained in a cassette in rotatable fashion, said hot stamping apparatus comprising:

a rotatable indexing table;

plural pallets arranged on said indexing table at a predetermined angle, each pallet having two or more of said spool holders respectively for holding said spool;

a spool setting station disposed at said rotatable indexing table;

a phase regulating station disposed at said rotatable indexing table and downstream from said spool setting station;

a bar code recording station disposed at said rotatable indexing table and downstream from said phase regulating station;

a spool removing station disposed at said rotatable indexing table and downstream from said bar code recording station; and rotating means for intermittently rotating said indexing table to move said pallets past said spool setting station, said phase regulating station, said bar code recording station and said spool removing station in sequence;

spool supplier means for supplying said spool;

orientation regulator means for rendering said spool core of said spool erect and said data disk oriented upwards after said spool is supplied from said spool supplier means;

spool setter means, disposed in said spool setting station, for setting said spool at each of said spool holders, said spool having been erected and transferred;

phase regulator means, disposed in said phase regulating station, for regulating a phase of said data disk by rotating said spool on each of said spool holders;

a movable unit, disposed in said bar code recording station, and including disk support means, shifter means and cushion means, said disk support means for supporting said data disk; said shifter means for shifting said disk support means between a retracted position away from said spool holders and an advanced position close to each of said spool holders, said data disk support means, in said advanced position, adapted for lifting said data disk by contact with a bottom of said data disk; and said cushion means biasing said disk support means upwards;

a hot stamping head, disposed in said bar code recording station, adapted to be pressed against a top of said data disk, for recording a bar code thereto while said data disk is supported on said disk support means;

spool remover means, disposed in said spool removing station, for removing said spool from each of said spool holders after said bar code is recorded.

12. A hot stamping apparatus as defined in claim 11, wherein said disk support means includes:

a flat portion having an edge, contacted on said bottom of said data disk;

two claws, protruded from said edge of said flat portion, for receiving said spool core therebetween and located away from said data disk; and an inclined face formed on said edge of said flat portion and inclined for smoothly avoiding collision between said flat portion and said data disk.

13. A hot stamping apparatus as defined in claim 12, further comprising:

a bar code reader for reading said bar code from said data disk while said spool removed from each of said spool holders is conveyed; and determiner means for determining correctness of said bar code in accordance with a result of reading of said bar code reader.

14. A hot stamping method of recording a bar code on a data disk provided on a spool, wherein said data disk is disposed near to an axial end of a core of said spool, and said spool is used for winding photo film about said spool core to be contained in a cassette in rotatable fashion, said hot stamping method comprising steps of:

providing said spool to be placed at one spool holder while said spool core is erect;

lifting said data disk at said spool holder by bringing a fork in contact with a bottom of said data disk, said fork supporting said data disk;

pressing a hot stamping head against a top of said data disk, for recording a bar code thereto; and biasing said fork upwards while said hot stamping head is pressed against said data disk.

15. A hot stamping method as defined in claim 14, further comprising steps of:

reading said bar code from said data disk; and determining correctness of said bar code in accordance with a result of reading of said bar code.

16. A hot stamping method for recording a bar code on a data disk provided on a spool, wherein said data disk is disposed near to an axial end of a core of a spool, and said spool is used for winding photo film about said spool core to be contained in a cassette in rotatable fashion, said hot stamping method comprising steps of:

supply said spool;

rendering said spool core of said spool erect and said data disk oriented upwards after said spool is supplied;

holding said spool on a spool holder, said spool having been erected;

moving said spool holder past a phase regulating station, a bar code recording station and a spool removing station in sequence;

regulating a rotational position of said data disk by rotating said spool on said spool holder while said spool holder is set at said phase regulating station;

lifting said data disk at said spool holder by bringing a fork in contact with a bottom of said data disk while said spool holder is set at said hot stamping station;

pressing a hot stamping head against a top of said data disk, for recording a bar code thereto;

biasing said fork upwards while said hot stamping head is pressed against said data disk; and removing said spool from said spool holder when said spool holder is set at said removing station.

17. A hot stamping method as defined in claim 16, further comprising steps of:

reading said bar code from said data disk while said spool removed from said spool holder is conveyed; and determining correctness of said bar code in accordance with a result of reading of said bar code.

* * * * *